Feb. 23, 1965    B. R. ADELMAN    3,170,291
LINER FOR PROPELLANT GRAINS
Filed July 1, 1963
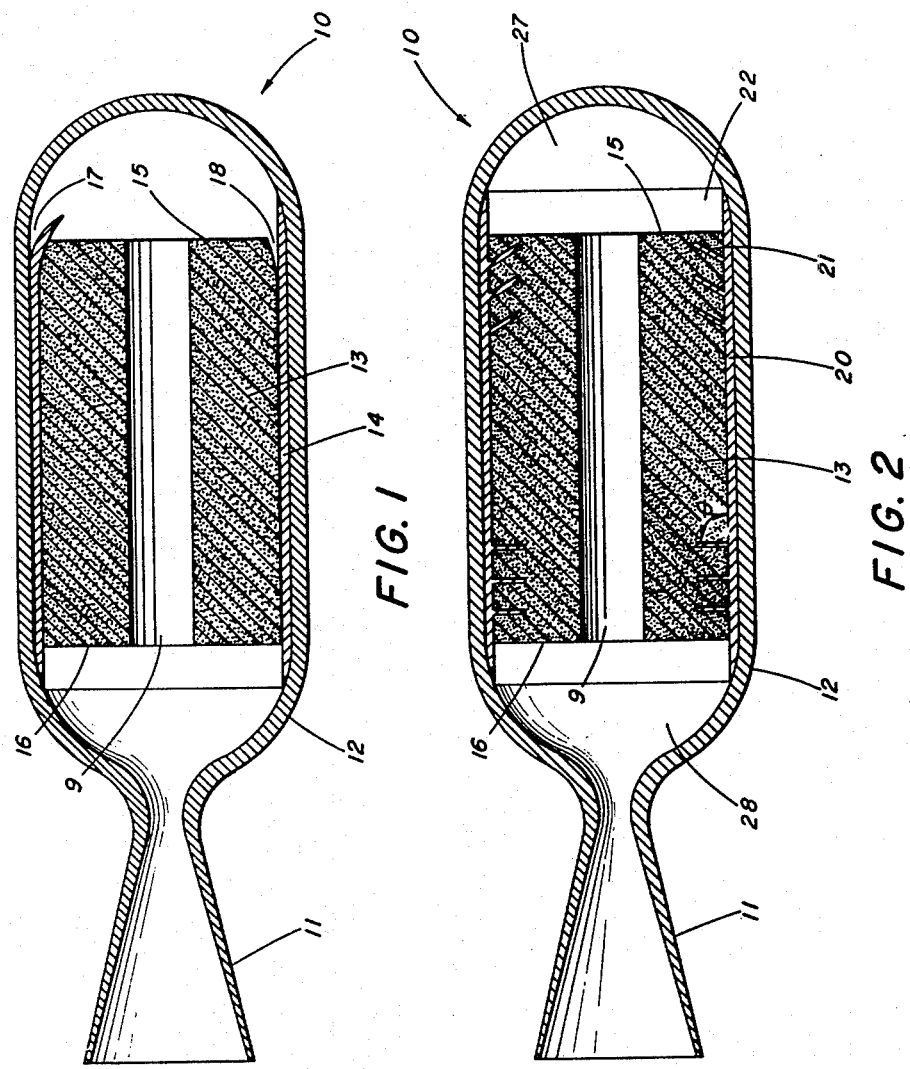
INVENTOR.

3,170,291
LINER FOR PROPELLANT GRAINS

Barnet R. Adelman, Atherton, Calif., assignor to United Aircraft Corporation, East Hartford, Conn., a corporation of Delaware
Filed July 1, 1963, Ser. No. 291,726
2 Claims. (Cl. 60—35.6)

The present invention relates to a liner for use in solid propellant rocket engines and, more particularly, to a liner design for preventing flame propagation along the propellant-liner interface.

In rocket devices employing solid, gas-producing charges, a problem exists in obtaining suitable propellant-to-case bonding. The failure of the bond between the propellant and the case is normally brought about by mechanical stresses concentrating in the region of the propellant-case interface. To overcome this problem of mechanical separation, primarily caused by the thermal coefficient of expansion differential between the propellant grain and the casing, liners have been developed to act as a strengthener along the high-shear interface. Typically, the prior art liners have been made of suitable material for covering the surface of the grain bearing against the case. Nonetheless, in using the prior art liners, it was found that hot combustion gases reaching the end portions of the grain often work into the interface between the liner and the propellant and ignite the propellant in such a manner as to cause catastrophic burning.

Generally, the present invention avoids the aforementioned problem by means of a liner design that improves interface strength and provides assurance that in the event separation does take place it will preferentially occur at the liner-case interface and not at the propellant-liner interface. Since the liner acts as an inhibitor to burning, hot gases between the case and liner cannot ignite the propellant. The present invention accomplishes this objective by providing on at least one end of the grain one or more integral annular disc portions which extend into the grain for a predetermined distance to mechanically grip the propellant grain. With such an annular disc or washer-shaped portion protruding into the grain, the liner is able to grip the propellant grain over a greater surface area than it does the case. Consequently, separation, should it occur, will invariably be along the liner-case interface. However, if separation should occur at the liner-propellant interface, the washer-shaped protuberance acts as a barrier to hot gas propagation along the interface. This lessens, materially, the probability of uncontrolled ignition to the point of catastrophic failure. Moreover, it has been found that by adjusting the location and size of the annular flame shield protruding into the grain, the thrust-time curve of the motor can be modified in a reproducable manner.

It is an object, therefore, of the present invention to provide a propellant liner which will materially lessen the probability of uncontrolled ignition in a solid rocket motor.

It is a further object of this invention to provide a liner which will preferentially separate at the case-liner interface.

It is still a further object of the present invention to provide a liner which will mitigate against the uncontrolled propagation of flame along the interface of the liner and propellant where the bond has, in fact, failed.

It is yet another objective of the present invention to provide a liner which is capable of modifying the thrust-time curve of a solid motor in a predictable and reliable manner.

Having generally indicated its nature and purpose, the present invention will now be more specifically described with reference to the attached drawings.

FIG. 1 is a sectional view of a prior art solid rocket motor.

FIG. 2 is a section view of a solid rocket motor employing the liner of the present invention.

In FIG. 1 a rocket motor 10 is shown with nozzle 11, casing 12 and solid propellant charge 13 having a liner 14. The propellant charge 13 is shown to contain a longitudinal, centrally located perforation 9 for conducting hot combustion gas toward the rocket nozzle 11 where it is exhausted to provide thrust to the system. Upon firing, hot gases likewise reach both the forward end 15 and the aft end 16 of the grain to produce some regression at both of these surfaces. The hot gases in this region tend to seek either the cavity 17 between the case and liner or the cavity 18 between the propellant and liner. Since the liner 14 is a burning inhibitor, gases reaching cavity 17 do not ignite the propellant at the interface. However, gases reaching a cavity such as 18 act directly upon the propellant and cause ignition. In some cases, the gases propagate for considerable distances causing complete fragmentation of the grain and destruction of the rocket motor.

Referring now to FIG. 2 which illustrates a preferred embodiment of the present invention, a rocket motor 10 is provided with nozzle 11, case 12, and liner 20 between grain 13 and motor case 12. As pointed out above, combustion of the solid propellant causes hot gases to collect in portions 27 and 28 of the rocket casing which have a tendency to propagate between the various interfaces as pointed out above. However, the liner 20 of the present invention has an integral annular disc portion 21 extending into the grain 13 providing thereby a substantial increase in surface area for adhesion. Consequently, separation of the material will preferentially occur at the bond between the case and the liner. However, even if the liner and propellant do separate, the annular portion 21 acts to inhibit extensive propagation of the flame along the cavity which forms between the propellant and the liner. Suitable materials for the liner-flame shield 20 and annular portions 21 are rubber and plastic which may be filled with insulating materials such as asbestos and fiberglass. The angle $\theta$ defines the suitable angle between the liner 20 and annular portion 21 and in many instances an angle of 90° is preferred because of manufacturing ease. However, if a preferential strengthening in one direction is preferred or it is necessary to direct the flames seeping into the interface along a preferred path, angles other than 90° may be employed. In order to provide an effective gas seal, portion 22 is provided to extend beyond the end of the grain where the pressures in chamber 27 and 28 will tend to force the liner against the casing surface.

In actual tests of several motors of the present invention, a cylindrical grain comprised essentially of polybutadiene-acrylic acid-acrylonitride, aluminum, ammonium perchlorate, and epoxy resin having a liner of the present invention with 90° annular portions of a silica-loaded, rubber-base material were fired. The rocket motor was prepared by bonding the liner 20 directly to the motor case 12 whereupon the propellant was cast in a conventional manner. After curing, the motor was fired to ascertain the heat resistance of the flanges 21 and their effect on propellant burning. A post firing examination revealed all sections of the liner 20 including annular portions 21 to be in excellent condition and there was no indication of separation of the liner 20 from the propellant. A study of the thrust-time curves clearly indicated that the propellant burned on both end surfaces 15 and 16 as well as the port interior 14 until the annular ring 21 was encountered whereupon all end burning ceased and the burning surfaces changed to an internal burning cylinder. The thrust-time curve that resulted showed a high rise of thrust initially which dropped markedly when the end burning stopped. The thrust subsequently increased gradually as the cylindrical burning surface increased during the course of the firing. In firing several cylindrical motors similar to the above, substantially identical thrust-time curves were produced. It is apparent that by providing several annnular rings 21 protruding into the propellant for various distances, considerable modification can be made in the thrust-time curve of a rocket motor.

It is evident that the present invention can be used in any rocket system employing a solid, gas-producing phase with the desired effects hereinabove described being achieved. Obviously, many modifications and variations of the present invention are possible in light of the above teachings. It is, therefore, to be understood that within the scope of the appended claims the invention may be practiced otherwise than as specifically described.

I claim:
1. A gas generator having in combination: a centrally perforated, substantially cylindrical, solid propellant grain; a casing for containing said grain having at least one cavity at the forward and aft ends wherein accumulated gases tend to work into the interface between the casing and the grain; and means for bonding said outside surface of said grain to the inside surface of said casing comprising a hollow cylindrical body of a predetermined thickness and at least one centrally perforated disc of substantially uniform thickness integral to the inside surface of said cylindrical body and extending into said propellant grain for a predetermined distance whereby each said disc tends to prohibit seepage of hot gases from each said cavity along the interface.

2. A gas generator as in claim 1 wherein said centrally perforated disc has a perforation substantially larger than the perforation in said solid propellant grain.

References Cited by the Examiner
UNITED STATES PATENTS

| | | | |
|---|---|---|---|
| 3,064,423 | 11/62 | Frey | 60—35.6 |
| 3,090,196 | 5/63 | Brewer | 60—35.6 |

SAMUEL LEVINE, *Primary Examiner.*

CARLTON R. CROYLE, *Examiner.*